United States Patent [19]

Kawabata et al.

[11] Patent Number: 5,460,847
[45] Date of Patent: Oct. 24, 1995

[54] CHOCOLATE COMPONENT-CONTAINING FOOD AND METHOD FOR PREPARING SAME

[75] Inventors: Yasushi Kawabata, Ibaraki; Terue Hoshino, Tsuchiura; Makoto Kobayashi, Ibaraki, all of Japan

[73] Assignee: Fuji Oil Co., Ltd., Osaka, Japan

[21] Appl. No.: 276,027

[22] Filed: Jul. 15, 1994

Related U.S. Application Data

[63] Continuation-in-part of Ser. No. 1,047, Jan. 6, 1993, abandoned.

[30] Foreign Application Priority Data

Apr. 15, 1992 [JP] Japan ...................... 4-95447

[51] Int. Cl.$^6$ ...................... A23G 1/00
[52] U.S. Cl. ...................... 426/631; 426/633
[58] Field of Search ...................... 426/631, 658, 426/660, 633

[56] References Cited

U.S. PATENT DOCUMENTS

| | | | |
|---|---|---|---|
| 4,762,725 | 8/1988 | Player et al. | 426/582 |
| 4,980,192 | 12/1990 | Finkel | 426/631 |
| 5,120,566 | 6/1992 | Baba et al. | 426/631 |

FOREIGN PATENT DOCUMENTS

| | | |
|---|---|---|
| 54-140773 | 11/1979 | Japan . |
| 61-52256 | 3/1986 | Japan . |
| 61-67444 | 4/1986 | Japan . |
| 61-139338 | 6/1986 | Japan . |
| 61-152240 | 7/1986 | Japan . |
| 62-163658 | 7/1987 | Japan . |
| 63-222652 | 9/1988 | Japan . |
| 1-256348 | 10/1989 | Japan . |
| 2-171154 | 7/1990 | Japan . |
| 3-139241 | 6/1991 | Japan . |

*Primary Examiner*—Anthony J. Weier
*Attorney, Agent, or Firm*—Wallenstein & Wagner, Ltd.

[57] ABSTRACT

A chocolate component containing food, and a method for preparing the same, characterized as an oil-in-water emulsion and a non-fluidized state at 5° C. containing 5–50 wt % of fat-free cacao, 10–44 wt % of oils, fats, or combination thereof, 0.5–20 wt % of non-fat milk solid, 10–50 wt % water and 0.05–1 wt % of polyglycerol fatty acid ester having an HLB value of not less than 8 as an emulsifier, and having an emulsion particle diameter in accordance with a laser diffraction particle size distribution measuring device of less than 7 μm in median diameter, and said food being in a non-fluidized state at 5° C. This food does not experience oil separation even if repeatedly melted, and has good workability.

3 Claims, No Drawings

CHOCOLATE COMPONENT-CONTAINING FOOD AND METHOD FOR PREPARING SAME

CROSS REFERENCE TO RELATED APPLICATION

This application is a continuation-in-part application of Ser. No. 08/001,047 filed on Jan. 6, 1993, now abandoned.

BACKGROUND OF THE INVENTION

1. Field of the Invention

The present invention relates to a chocolate component containing food, more particularly, a chocolate component containing food that is in a non-fluidized state at 5° C., is considered a "ganache", and from which oil does not separate even if melted repeatedly.

2. Description of the Related Art

A "ganache", which is prepared by mixing chocolate and cream, is a material for confectionery, which is used, for example, on a cake, in the form of flowers, or for sandwiching between cake dough. However, a ganache with good physical properties has not been obtained because conventional ganaches are unstable in the emulsified state, separate when used, and become difficult to apply because of increasing viscosity, and in particular, when they are solidified by cooling and then heated oil separates therefrom.

Heretofore, many kinds of oil-in-water type processed chocolate foods have been disclosed. For example, JP.A.62-163658 discloses a processed chocolate food that is improved in the emulsified state. It uses sucrose fatty acid ester and lecithin as an emulsifier. Also, in JP.A.2-171154 and 3-139241, a sucrose fatty acid ester is utilized as an emulsifier. However, in these references, a sufficient result is not obtained. For example, when using sucrose fatty acid ester and lecithin as an emulsifier, viscosity increases in a system that contains large amount of cacao solid contents containing milk solid.

SUMMARY OF THE INVENTION

Accordingly, an object of the invention is to provide a ganache like chocolate component containing food that does not suffer oil separation even if repeatedly melted, and has good workability.

These and other objects, features and advantages of the invention will become more apparent from the detailed description and examples given below.

DESCRIPTION OF THE PREFERRED EMBODIMENTS

The inventors found that the above object is attained by forming an oil-in-water emulsion by shearing a mixture of fat free cacao, oils and fats, non-fat milk solid and water in a specific ratio in the presence of polyglycerole fatty acid ester having a specific HLB range.

Thus, the invention is a chocolate component containing food in an oil-in-water emulsion form that contains 5–50 wt % of fat free cacao, 10–44 wt % of oils, and fats, or combination thereof, 0.5–20 wt % of non-fat milk solid, 10–50 wt % of water and 0.05–1 wt % of polyglycerol fatty acid ester having an HLB value of not less than 8 as an emulsifier, and has an emulsion particle diameter in accordance with a laser diffraction particle size distribution measuring device of less than 7 μm in median diameter, and is in a non-fluidized state at 5° C.

The fat free cacao utilized in the invention is a component formed by removing cacao butter from a solid derived from cacao beans. As a source of fat free cacao, cacao mass, cacao chocolate derived therefrom, and their processed products can be used. The fat free cacao is suitably contained in an amount of 5–50 wt %, preferably 10–40 wt %, based on the whole composition. At a level less than the lower limit, it is difficult to obtain a ganache having plasticity, and at a level more than the upper limit, viscosity increases and it is difficult to prepare.

Water can be used but preferably a water component containing skim milk powder or whole milk powder, a water component containing a milk component such as natural green cream, milk, concentrated milk, or synthetic cream, or a water component containing saccharides is used. The water content is suitably 10–50 wt % based on the whole composition. At a level less than the lower limit, it is difficult to emulsify into oil-in-water, and at a level greater than the upper limit, it is difficult to obtain a ganache having plasticity.

Non-fat milk solid is an essential component for obtaining a stable oil-in-water emulsion. It is contained in an amount of 0.5–20 wt %, preferably milk solid can be one derived from the above water component, or one derived from chocolate utilized as a source of fat free cacao. At a level less than the lower limit, an oil-in-water emulsion becomes unstable, and at a level greater than the upper limit, the viscosity of the emulsion increases thereby lowering the quality of the product.

An example of oils, fats, or combination thereof include vegetable fats and oils such as rapeseed oil, sunflowerseed oil, cottonseed oil, peanut oil, rice oil, cone oil, safflower oil, olive oil, kapok oil, sesame oil, palm oil, shea fat, sal fat, cacao butter, coconut oil, and palm kernel oil, as well as animal fats and oils such as milk fat, beef tallow, lard, fish oil, and whale oil, and any combination thereof. Also their hardened, fractionized, or esterinterchanged form can be used. Butter, margarine, shortening, or hardbutter on market can also be used. The amount of oils, fats, or combination thereof is suitably 10–45 wt % based on the whole composition. At a level less than the lower limit, it is difficult to obtain a ganache having plasticity. And at a level greater than the upper limit, it is difficult to obtain a stable oil-in-water emulsion.

A chocolate component containing food of the invention contains 0.05–1 wt % of a polyglycerol fatty acid ester having an HLB value of not less than 8 as an emulsifier, which is necessary to form a stable oil-in-water emulsion. At a level less than 0.05 wt %, there is no effect, and at a level more than 1 wt %, the taste of the emulsifier is highly seasoned and is undesirable. At a level of HLB less than 8, the food tends to phase separate when heated repeatedly. Therefore, the HLB value is preferably more than 8, and most preferably more than 9.

An example of a polyglycerol fatty acid ester comprises tetraglycerol monolaurate, hexaglycerol monostearate, hexaglycerol sesquistearate, hexaglycerol monooleate, hexaglycerol monolaurate, decaglycerol monostearate, decaglycerol monooleate, decaglycerol monolaurate and the like. In addition to the above emulsifier, lecithin, a sucrose fatty acid ester, a sorbitan fatty acid ester, monoglycerol and the like can be added optionally.

And fruit juice and liquors can be added to give flavor and maintain quality, and a sweetener such as starch syrup can be added to adjust the sweetness. Further, as a stabilizer, gums such xanthane gum, locust bean gum, guar gum, gum arabic, CMC, fine crystalline cellulose, pectin, agar, carrageenan, gelatin and the like can be added.

A chocolate component containing food of the invention is prepared as follows. A polyglycerol fatty acid ester having an HLB value of not less than 8 is added to the water component containing non-fat milk to form an aqueous phase and continuously heating said aqueous phase to 65°–70° C. and into said aqueous phase are added, oils, fats, or combination thereof and chocolate to form a mixture. Then, this mixture is emulsified by shearing in a high speed stirring tank such as a homomixar (Tokushu Kika Kogyo K.K.) to form an emulsion having an emulsion particle diameter in accordance with a laser diffraction particle size distribution measuring device of less than 7 μm in median diameter, and is optionally homogenized (30–200 kg/cm$^2$). This emulsion is cooled to less than 40° C. to prepare a chocolate component containing food of the present invention. Sterilization can be performed prior to cooling and the homogenization step. The term "median diameter" indicates a particle diameter corresponding to 50% of cumulative distribution based on particle diameter volume.

The invention will be understood more readily with reference to the following examples. These examples are intended to illustrate the invention and do not limit the scope thereof. All parts and percents specified in the examples are by weight unless otherwise stated.

Example 1

Into 40 parts commercially available vegetable cream (Fuji sunny topping 200 manufactured Fuji Oil Co.) and 10 parts water, 1 part decaglycerole esyer monooleate (HLB= 12.9) was added and this mixture was heated to 65° C. To this mixture, 50 parts of commercially available sweet chocolate with 33% oil content (Fuji sunny sweetchocolate manufactured Fuji Oil Co.) was added and stirred for 30 min at 65° C. at 10000 rpm using a homomixer (Tokushu Kika Kogyo K.K.) to form an emulsion, then cooled to 35° C. The resultant emulsion has a smooth texture and good spreadability. This emulsion solidifies at 5° C., after repeated melting at 45° C. 5 times, and does not display oil separation, and is easy to enrobe. The median diameter measured in accordance with a laser diffraction particles size distribution measuring device (LA 500, Horiba Seisakusho K.K.) was 3.2 μm.

Comparative Example 1

Into 40 parts commercially available raw cream (oil content 45%), 10 parts water and 20 parts sucrose, 1 part sucrose fatty acid ester (S-170 manufactured by Mitsubishi Kasei K.K.) was dissolved in 30 parts commercially available cacao liquor (Fuji cacao mass 100 manufactured Fuji Oil Co.), this mixture was stirred at 65° C. at 200 rpm for 30 minutes to form an emulsion, this emulsion was then cooled to 35° C. And when this and emulsion was cooled to 5° C. and heated to 45° C. to melt, the emulsion displayed oil separation. The median diameter immediately after stirring was 15 μm.

Comparative Example 2

An emulsion was prepared following the procedure of Example 1, except that 1 part decaglycerole ester decaoleate (HLB=3.5) was used as an emulsifier in spite of decaglyceroleester monooleate and it was added into 50 parts of sweet chocolate with 33% oil content. The resultant emulsion displayed oil separation after cooling to 5° C. and heated to 45° C. so as to melt same.

Example 2

0.7 parts decaglycerole ester monostealate (HLB=13) and 4 parts skim milk powder was dissolved in 20 parts water. Into this solution, 15 parts sucrose, 15 parts maltose powder, and 13 parts commercially available cacao powder with an oil content of 11% (Fuji cacao cake 200 manufactured by Fuji Oil Co.). This mixture was stirred at 10000 rpm using a homomixer (Tokushu Kika Kogyo K.K.). And to this mixture, 35 parts of purified coconut oil in which 0.2 parts soybean lecithin was gradually added, emulsified at 65° C. for 30 min, and then cooled to 35° C. 2 parts of commercially available rum was then added to this emulsion and the mixture was solidified in a refrigerator at 5° C. The median diameter measured as above was 2.3 μm. This solidified mixture was heated to 40° C. in a 60° C. water bath to melt same and was used as a component of ice cream. The resultant ice cream had a hardness such that a spoon could be inserted into said ice cream when frozen.

Example 3

Into 40 parts commercially available raw cream (oil content 45%) and 10 parts water, 1 part hexaglycerole ester monostealate (HLB=11.6) was added and this mixture was heated to 65° C. To this mixture, 50 parts commercially available milk chocolate with an oil content of 33% (Fuji sunny milk chocolate manufactured by Fuji Oil Co.) was added and stirred at 65° C. at 200 rpm for 30 min. This mixture was then homogenized at 150 kg/cm$^2$ to form an emulsion and cooled to 35° C. The median diameter measured as above was 1.7 μm. This emulsion was coated on butter cream coated sponge cake with a diameter of 18 cm using a chocolate enrober (Cacaobury Co., France, MS2000) at 35° C. for 8 hours. Oil separation or a viscosity increase did not occur.

Comparative Example 3

An emulsion was prepared following the procedure of Example 3, except that the homogenization step was omitted. The median diameter was 11 μm. This emulsion was coated on sponge cake as above, and the viscosity increased gradually and after 30 min, it became impossible to apply.

Example 4

1 part tetraglycerol ester monostealate (HLB=11.6) was added to 40 parts sorbitol. To this mixture, 50 parts commercially available milk chocolate with an oil content of 33% (Fuji sunny milk chocolate manufactured by Fuji Oil Co.) was added and stirred at 65° C. at 10000 rpm for 30 min to form an emulsion. After cooling to 35° C., 10 parts commercially available brandy was added to this emulsion, and the mixture was solidified in a refrigerator at 5° C. The median diameter measured as above was 5.1 μm. The solidified mixture was heated to 45° C. in 60° C. water bath to melt and then cooled to 30° C. And the emulsion was filled into hollow chocolate (manufactured by Fuji Oil Co.) and sealed with tempered chocolate. The product was stored at 20° C. for 180 days, after which the product had a favorable flavor, a smooth texture and no coarse crystallines of oil and fat.

We claim:

1. A chocolate component containing food in an oil-inwater emulsion form comprising 5–50 wt % of fat-free cacao, 10–44 wt % of oils, fats, or combination thereof, 0.5–20 wt % of non-fat milk solid, 10–50 wt % water and 0.05–1 wt % of polyglycerol fatty acid ester having an HLB value of not less than 8 as an emulsifier, said emulsion having an emulsion particle diameter in accordance with a laser diffraction particle size distribution measuring device of less than 7 μm in median diameter, and said food being in a non-fluidized state at 5° C.

2. The chocolate component containing food of claim 1, wherein the HLB value of said polyglycerol fatty acid ester is not less than 9.

3. A method for preparing a chocolate component containing food in a non-fluidized state at 5° C. comprising the following steps:

adding a polyglycerol fatty acid ester having an HLB value of not less than 8 to a water component containing non-fat milk to form an aqueous phase;

continuously heating said aqueous phase to 65°–70° C., adding oils, fats, and combination thereof and fat-free cacao so as to make the above food to be a non-fluidized state at 5° C. into said aqueous phase to form a mixture;

shearing said mixture to form an emulsion having an emulsion particle diameter in accordance with a laser diffraction particle size distribution measuring device of less than 7 μm in median diameter; and cooling said emulsion.

* * * * *

UNITED STATES PATENT AND TRADEMARK OFFICE
CERTIFICATE OF CORRECTION

PATENT NO. : 5,460,847
DATED : October 24, 1995
INVENTOR(S) : Yasushi Kawabata et al.

It is certified that error appears in the above-indentified patent and that said Letters Patent is hereby corrected as shown below:

Column 3, line 34, delete "esyer" and insert --ester--.

Column 4, line 50, delete "monostealate" and insert --monostearate--.

Signed and Sealed this

Thirteenth Day of August, 1996

Attest:

BRUCE LEHMAN

Attesting Officer     Commissioner of Patents and Trademarks